J. MAGEE,

Assignor to the Magee Furnace Co.

HOT-AIR FURNACE.

No. 7,710. Reissued May 29, 1877.

Witnesses:

Edw. W. Bond

James H. Gealy

Inventor:

John Magee.

by J. A. Bolsett

Atty.

N. PETERS, PHOTO-LITHOGRAPHER, WASHINGTON, D. C.

UNITED STATES PATENT OFFICE

JOHN MAGEE, OF CHELSEA, ASSIGNOR TO THE MAGEE FURNACE COMPANY, OF BOSTON, MASSACHUSETTS.

IMPROVEMENT IN HOT-AIR FURNACES.

Specification forming part of Letters Patent No. 145,512, dated December 16, 1873; reissue No. 7,710, dated May 29, 1877; application filed February 14, 1876.

*To all whom it may concern:*

Be it known that I, JOHN MAGEE, of Chelsea, in the county of Suffolk and State of Massachusetts, have invented certain Improvements in Casings or Coverings for Furnaces, of which the following is a full, clear, and exact description, reference being had to the accompanying drawings, making part of this specification.

Figure 1:
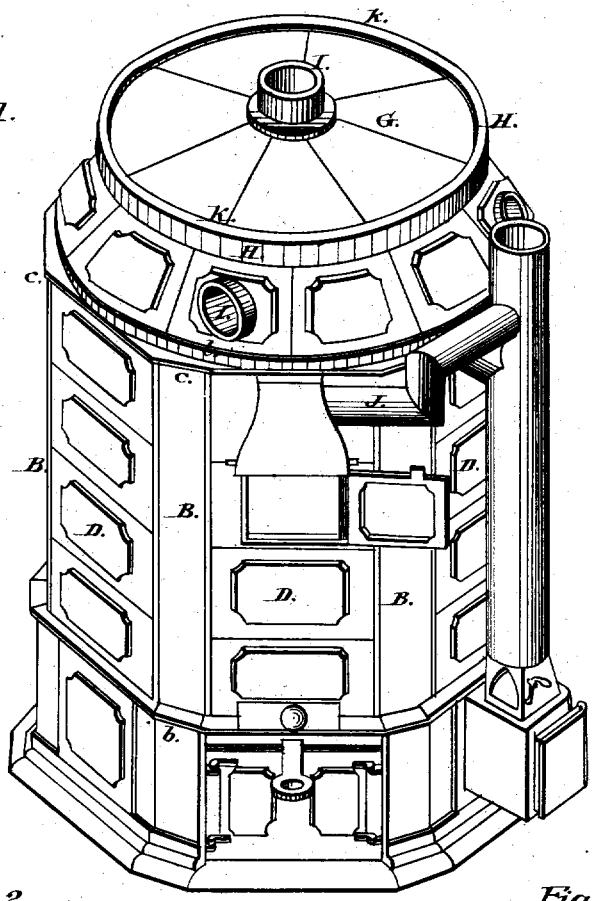
Figure 2:
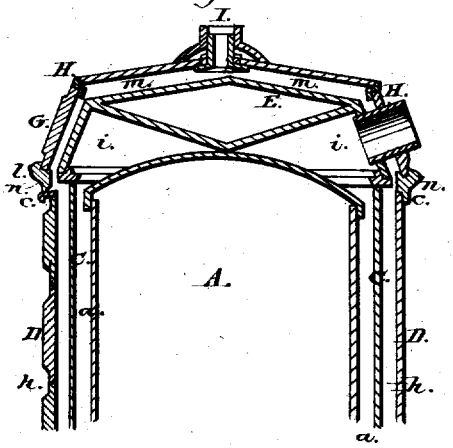
Figure 3:
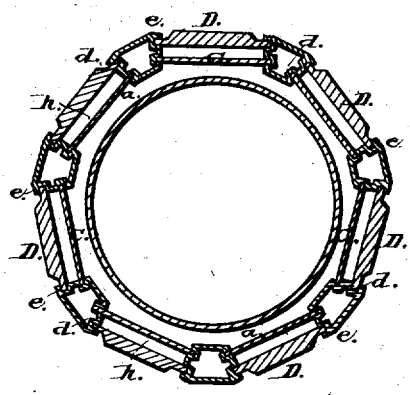

Figure 1 is a perspective view of the furnace having my improvements applied thereto. Fig. 2 is a vertical section extending only through my improved casing. Fig. 3 is a horizontal section.

Furnaces for heating buildings are ordinarily provided with an outer casing having an air-space between it and the furnace proper. In the construction of what is termed "set" or permanent furnaces the casing is composed of brick, and in portable furnaces of metal. The metal casing is objectionable on account of the great loss of heat by radiation, and the brick casing is objectionable for the reason that it is expensive to construct, occupies considerable space, and cannot be easily removed when the furnace is to be repaired. To avoid the loss by radiation arising from the employment of an outside metal casing, and to overcome the said objections to a brick casing, is the purpose of my present invention, which consists in the combination, in a furnace, of a fire-pot or radiator and an outer casing the wall of which is formed mainly of removable panels of non-conducting material, such as soap-stone or slabs of fire-clay.

To enable others skilled in the art to make and use my invention, I will proceed to describe the manner in which I have carried it out.

In the said drawings, A is the furnace proper, the outside of the cylindrical portion of which is surrounded by a series of vertical metal posts or standards, B, placed at intervals from each other, and at a short distance from the furnace, so as to form with the casing an air-space, *a*, around the said posts or standards, extending from the base *b* of the furnace to a point near the top, and being securely held in place and together by a metal cap passing around the outside of their upper ends, the whole serving as a frame, B *c*, each post B of which is provided on each side with two grooves, *d e*, extending vertically through their length. The inner row of grooves *d* are for the reception of a series of plates, C, of metal, which are slid down within the grooves into position for one to rest upon the other, and forming an inner casing, the outer row of grooves *e* being for the reception of a series of panels or slabs, D, of non-conducting material, and forming an outer casing, the inner surface of each panel being situated a short distance from the outer surface of each plate C, the space between the two walls forming an air-chamber, *h*. The cold air entering the inner space *a* is intensely heated by contact with the radiator or fire-pot, and, being rarefied, passes up through an air-space, *i*, communicating therewith, and situated between the furnace and the inner metal lining or casing *i* of the top E, from which the heat is conducted to the various apartments through the circulating-pipes. (Not shown.) The outside of the top of the casing is (like the outside of the cylindrical portion) composed of panels *g* of like character, set in a metal frame, H, and consisting of an upper ring, *k*, and lower ring *l*, secured together, and resting on the top of the frame of the cylindrical portion of the casing. Between the inner and outer walls of the top of the casing is formed an air-space, *m*, which communicates, through openings *n*, with the air-space *h* between the casings C D, surrounding the upright portion of the furnace. The hot air that radiates from the outside of the inner casing C passes up the air-spaces *h* and *m*, into and through an outlet-pipe, I, provided at the center of the top of the casing, whence it is utilized by being conducted to one of the apartments to be warmed.

From the foregoing it will be seen that the property of the non-conducting material forming the outer casing is to intercept the passage of the heat outwardly into the apartment in which the furnace may be placed, by confining the heat within the spaces *h* and *m*, whereby the loss of heat by radiation incident to a furnace having an ordinary casing of metal is effectually prevented. Furthermore, by constructing the casing of separate and independent pieces or panels capable of being readily removed, instead of a permanent wall of brick, the labor of setting up, repairing, or removing the furnace is very materially reduced.

If desired, the non-conducting panels herein described may be faced with metal.

J is a hollow trunk, the opening at the bottom of which is situated immediately above the opening through which fuel is admitted to the furnace. This pipe is provided with a damper, (not shown,) and is connected with the ordinary vertical pipe leading to the chimney-flue.

In the foregoing description and in the drawing, a double wall of panels is shown and set forth; but it is obvious that the main purpose of my invention is accomplished by the use of the outer casing, formed principally of non-conducting material, such as soap-stone, this outer casing forming one of the principal features of my invention, which is to construct a furnace the walls of which are composed mainly of panels of non-conducting material, having all the convenience of a portable furnace, and possessing the non-radiating value of the brick furnace, without its objections.

I claim as my invention—

1. The combination of the casing formed of removable separate panels of non-conducting material, secured in grooved posts B, with the fire-pot or radiator of a hot-air furnace, substantially as set forth.

2. The combination of the outer casing formed of the grooved posts B and removable panels D, of soap-stone or other suitable non-conducting material, with the fire-pot A and the intervening casing C, substantially as set forth and shown.

JOHN MAGEE.

Witnesses:

DEXTER D. BORONSON,
ALBERT N. SARLIN.